United States Patent

Thuillier

[15] 3,669,846

[45] June 13, 1972

[54] PROCESS FOR OBTAINING AND PRESERVING STABLE BACTERIAL VARIANTS

[72] Inventor: Yvonne Thuillier, Paris, France

[73] Assignee: Albert Rolland S.A., Paris, France

[22] Filed: March 23, 1970

[21] Appl. No.: 21,765

[30] Foreign Application Priority Data

March 25, 1969 Great Britain......................15,672/69

[52] U.S. Cl....................................195/96, 195/79, 195/112
[51] Int. Cl. ......................................................C12k 3/00
[58] Field of Search ..................424/92; 195/76, 75, 104, 79, 195/112, 96

[56] References Cited

OTHER PUBLICATIONS

Sharp; " Proc. Soc. Exp. Biol. and Med." 87:94– 97 (1954)

Panos et al.; " J. Bact." 78:247– 252 (1959)

*Primary Examiner*—A. Louis Monacell
*Assistant Examiner*—Max D. Hensley
*Attorney*—Bacon & Thomas

[57] ABSTRACT

The invention provides a process for obtaining and preserving stable bacterial variants arising from pathogenic or non-pathogenic bacteria, the said process comprising subjecting the bacteria, in an acellular medium, at the moment of scissiparity, to the action of an inducing agent, especially plasmolysis by osmotic shock, so as to do away with the cell wall, and culturing the variants obtained on an osmotically equilibrated acellular nutrient medium. The bacterial variants so obtained can be used for the preparation of vaccines and of reagents for sero-diagnostics and the identification of germs of atypical illnesses.

10 Claims, 20 Drawing Figures

Inventor
YVONNE THUILLIER
By Bacon & Thomas
Attorneys

Inventor
YVONNE THUILLIER
By Bacon & Thomas
Attorneys

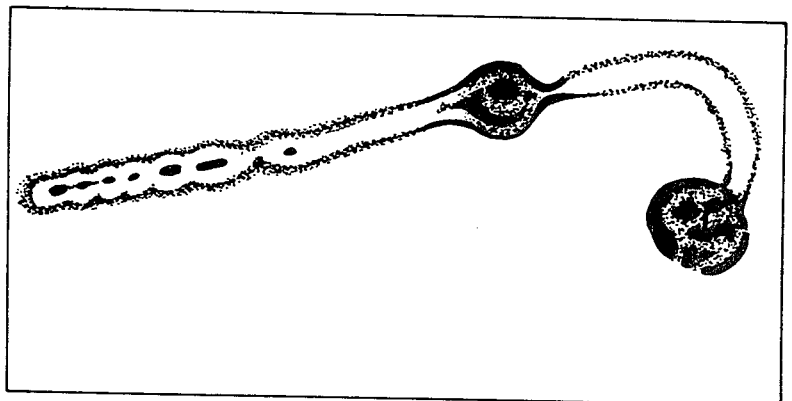
FIG.11
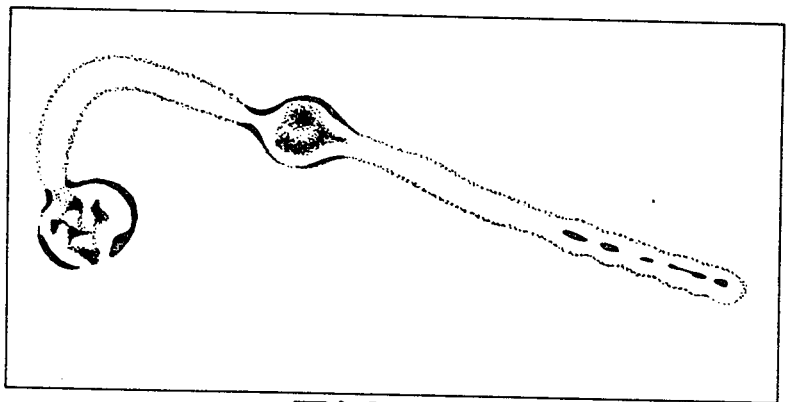
FIG.11bis
FIG.12
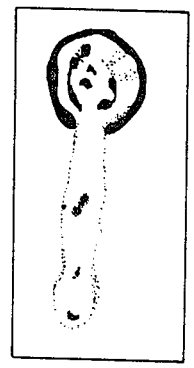
FIG.12bis

PROCESS FOR OBTAINING AND PRESERVING STABLE BACTERIAL VARIANTS

The present invention relates to a process for obtaining and preserving stable bacterial variants from bacteria, the said bacterial variants reproducing with a completely different morphology from that of the bacteria from which they originated.

The concept of bacteria capable of reproduction in a completely different morphology from that of conventional bacteria had its origin in the first studies of the L. forms of KLIENEBERGER. These forms, which appeared spontaneously, were called LI forms, after the Lister Institute.

They were identified by DIENES as being not symbiotics but true bacterial variants. KLIENEBERGER-NOBEL and TULASNE shared this opinion.

The L forms were long considered to be the result of laboratory manipulations and hence to be artificial creations. However, it proved possible to observe the existence of normal bacteria in L forms arising spontaneously in the case of certain micro-organisms which possess an extreme polymorphism viz. *Haverhillia moniliformis* and *Spherophorus funduliformis*, the agents of post-angina septicaemia in man.

PIERCE, DIENES, KLIENEBERGER and TULASNE succeeded in achieving, in the laboratory, the transformation into the L forms of numerous bacteria, both bacilli and cocci: e.g. Salmonella, Shigella, Typhus, Clostridia, Gonococcus, Streptococcus and para-influenza, the result being achieved by the action of penicillin.

Numerous other agents are capable of bringing about this L transformation: antibiotics which act on the bacterial wall (bacitracin and cycloserine), chemical agents (glycine at high concentration), enzymes which cause lysis (lysozyme and lysostaphine), physical agents (ultraviolet radiations) and biological agents (phages, antibodies plus complement).

In order to describe a particular type of L forms, the concept of protoplasts and of spheroplasts was introduced. Protoplasts, this being a term of botanical origin given by WEIBULL and McGUILLEN, are globular organisms originating from bacteria as a result of the action of penicillin or of lysozyme. Spheroplasts are the L forms of characteristic globular morphology, originating from bacteria into which they may reconvert when the inducing agent which has caused the transformation into the L forms, (e.g. treatment with benzyl-penicillin or other penicillins, with cyloserine, lysozyme at pH 8.8, or lysozyme in the presence of ethylenediaminetetraacetic acid and Tris buffer), is removed.

The L forms of the bacteria are, in general terms defined as globular elements originating from bacteria of which the wall has been modified or completely removed by various factors. They can give rise to colonies of two different types, types L3B and L3A according to DIENES. From a morphological point of view, the organisms show polymorphism, and the descriptions thereof change depending on the author and the details of the process of obtaining them:

giant globular bodies of WEIBULL, certain constituents of the wall have disappeared because the bacterium has lost its shape;

filaments which, to KLIENEBERGER-NOBEL, are artificial structures explained by the great plasticity of the L forms which become deformed in culture broths;

elementary corpuscles of KLIENEBERGER or dwarf forms of TULASNE, which are inframicroscopic, filterable and viable elements.

In fact, the evolutionary cycle of the bacterial variants has hitherto not been proved.

On the cytological plane, there is, in the case of the L forms, a change or disappearance of the wall, consisting of several successive layers containing two essential constituents: N-acetyl-muramic acid and N-acetyl-glucosamine. The wall does not appear to participate in the osmotic equilibrium of the bacterial cytoplasm. The permeability of the bacterial cell is due to the cytoplasmic membrane consisting of lipids and proteins, enzymatic systems and specific permeases. Unlike the bacterium, the cytoplasm is relatively discreet relative to the mass of the nuclear vesicle.

As regards to cultural characteristics, certain of the authors quoted have used media rich in proteins and lipids in an attempt to preserve the L forms; this has been done by enriching the usual culture media with a beef heart extract with the addition of peptone, horse serum or beef serum at high levels (10 to 20 percent by weight of the medium), or with brewer's yeast.

Others envisage that the L forms are dependent on sterols and certain lipids.

On the plane of the antigenic structure, the techniques used were those employed for bacteria; they were unable to produce positive results, the mistake having been constantly to want to find the entire mosaic of the antigens characterizing the bacterium in micro-organisms which displayed a true genetic mutation.

Finally, the authors who have studied the pathogenic power of the L variants obtained in vitro have in the majority of cases concluded that there is an absence of virulence "connected with the impossibility of these variants surviving in the organism." In vivo, the existence of L forms has been observed in rats and mice after injection of Streptococci and treatment with penicillin (25 days' survival in the peritoneum in mice).

Other L forms originating from Staphylococcus, Proteus and pyocyanic bacillum have been observed in the blood of subjects suffering from chronic infections (urinary conditions). It was only possible to establish their diagnosis by returning to the original bacterium, the L variants being unstable.

The inhibition or dissolution of the wall can be partial or total. In this respect consideration has been given previously to the L3B type, which results from a phenotypical transformation with the possibility of reversion to the original bacterium, and the L3A type which is the result of a genotypical transformation, the biosynthesis of the rigid bacterial wall being definitively inhibited. This stable L3A form represents a completed L transformation, the L3B stage thus only being an intermediate form.

After having briefly recalled the prior art as regards the L bacterial variants to be found in works which are frequently contradictory as regards the appearance of the cultures, their morphology, their cytology, the absence of a pathogenic power of the cultures in vitro and the existence of this pathogenic power in variants isolated in vivo (unstable variants reverting to the original bacterium), it proved impossible to pursue the study by virtue of the impossibility of survival and preservation of the L variants.

Since the investigators do not have the necessary means for preserving the L variants, it was impossible to undertake the study of the latter on a serological plane and the study of their specific pathogenic effect as a function of the original bacteria from which they stem.

The applicants have found that the mutations can be reproduced and that the presence of the cell wall is not linked to the viability of the germs. A fine semipermeable membrane adheres to the cytoplasm and plays a considerable role in the phenomena of osmotic nutrition and of the elaboration of new walls in daughter cells when the mutant reverts to the original bacterium.

Being devoid of a rigid cell wall, and defined by a fine cytoplasmic membrane, these mutants differ markedly from the original bacterium, whether the latter is pathogenic or not. Because of their very small size or because of an extreme plasticity which makes them easily malleable, they have the ability to pass through ultra-filters. Their morphological structure and their method of reproduction are intractable by conventional bacteriological methods of investigation. On solid media, their colonies are very small, 10 to 600 $\mu$, and frequently escape the naked eye.

In bacteriology, the optical microscope (enlargement 1,300 to 2,000) gives a picture of ring formations, of pseudomycelial filaments, and of giant globular bodies, but does not permit a distinction of two points spaced less than 200 mμ apart and hence of organisms which are smaller than this limit.

As these mutants are not protected by a cellular wall, the conventional staining processes of bacteriology are not longer suitable, in the sense that the latter (especially the Gram stain) only strain the cell wall.

In cytology, the electron microscope (enlargement 20,000) shows them as elementary corpuscles, the size of which varies from 125 to 150 mμ, without having been able to establish whether the isolated bodies are not quite simply one phase of a reproductive cycle.

The conventional bacteriological media do not make it possible either to follow or to preserve the stable variants which, being sensitive to the osmotic pressure, burst in a hypotonic medium.

The originality of the invention essentially resides in the means which, on the one hand, make it possible to obtain stable L variants starting from culture strains and, on the other hand, make it possible to preserve them. The invention makes it possible to define a process which can be carried out industrially, leading to bacterial variants the morphological appearances of which are similar to those of the mycoplasms. The reproductive cycle of the variants has been perfectly defined, their cytotoxic power in vitro has been demonstrated and their similarity with the strains of Mycoplasma isolated from "atypical" illnesses has been demonstrated.

The process of production and preservation according to the invention comprises causing to act on pathogenic or non-pathogenic bacteria, in an acellular medium, at the moment when the said bacterium is in process of cellular division (scissiparity), a chemical, biochemical, or physical inducing agent which destroys the bacterial cell wall, without killing the bacteria, and culturing and transplanting the variants thus obtained at a temperature of 22° to 37° C. on an acellular medium and equilibrated on an osmotic plane by elements which regulate the cellular permeability, the partial osmotic pressure of the combination of the said elements being between 20 and 30 atmospheres.

The media for production and preservation have to be acellular for two reasons; first, because the processes of acellular culture are industrially more economical than those which use cellular cultures, and secondly, because it is necessary to avoid any error of interpretation. The applicant has chosen synthetic media containing neither serum nor lysozyme nor antibiotic, for the second reason.

The bacterial strain, preferably as a 24 hours old culture, is inoculated into water containing peptone and glucose and enriched in nucleic acids and adenosine diphosphate, and is subjected to the induction process.

As inducing agents, it is possible to use antibiotics which act on the wall where the substrate which they inactivate is located, or antibiotics which do not penetrate into the bacterial body, enzymes which produce lysis of the wall, ionic or non-ionic detergents which dissolve the wall, or physical agents such as radiations or plasmolysis which detach the wall; but it is indispensible, in order to achieve a genotypical mutation and a stable variant, that the action of the inducing agent should take place at the moment of scissiparity, this being a moment which can be recognized by the growth curve of the bacterium and the determination of its exponential phase.

The optimum movement for the bacillus to be acted on by the inducing agent is the moment of cellular division, which is in fact a period favorable to errors in the genetic code.

On observing cellular divisions under the optical microscope, it is found that the scission of the nuclear particles much precedes that of the cytoplasm. It is indispensable to determine with certainty the rhythm and regularity of the phenomenon by a mathematical representation. The speed of growth was proportional to the density of the bacilli and the rate of growth was constant under the experimental conditions, and consequently the Malthus exponential was used to determine the number of generations per hour and hence the moment of cellular division. If time is plotted as the abscissa and the logarithm of the culture densities, measured by nephelometry, is plotted as the ordinate, the exponential phase of growth is represented by a straight line.

During the exponential phase, the rate of growth being inversely proportional to the generation time, it is possible to deduce from it the number of minutes which elapse between two scissiparities, by the following equation:

Number of divisions per unit time:

$$\mu = \frac{\log X_2 - \log X_1}{(t_2 - t_1) \log 2}$$

where $\mu$ expresses the rate of growth, $X_1$ the culture density at time $t_1$ and $X_2$ the density at time $t_2$.

The generation time, $t(g) = 1/\mu$

The collection strains, especially *Proteus rettgeri*, show a bipartition about every half hour. Activating the metabolism allows four scissiparities to be achieved per hour, this being a physiological condition which brings them close to that of pathogenic bacteria.

If successive transplantations are carried out, the bipartitions affect a greater number of bacteria but the time dividing two generations is unchanged. The largest number of bacteria in course of division is obtained by carrying out three to four successive transplantations during the favorable scissiparity and, knowing the time of cellular division, one avoids the bacteria which are slightly in advance not dividing by synchronizing the new cultures at 10° C. 5 minutes before the bipartition. The relative lowering of the temperature inhibits the scissiparity but not the metabolic activity of the organisms. The optimum growth temperature of 37° C. merely favors the scissions.

The increase in growth is measured and is followed by a period of latency during which the bacteria synthesize their proteins and their lipids and when the generation time has elapsed the cellular density again increases.

Using this process, practically all the micro-organisms divide at the same moment but in order to guard against ageing of the culture it is prudent to cause the inducing agent to act from the first cellular divisions onwards.

The strains treated in this way are then in the optimum condition for undergoing the action of the inducing agent. They are in a so-called "competent" state. No L mutation whatsoever can be detected at this stage.

Among the inducing factors which can be used at the moment of cellular division of the bacterium, the applicants prefer to employ plasmolysis (induction by osmotic shock).

If bacilli having a fine parietal structure are subjected to a hypertonic medium, the hypertonicity produces rupture of the intracellular partitions, visible by staining with a dilute solution of Crystal Violet and mordanting with tannin. Deprived of the protective envelope, the bacilli become malleable corpuscles; they rapidly undergo lysis in the usual bacteriological media, swell and burst if the liquid media are not equilibrated from an osmotic point of view.

It is one of the important characteristics of the process of the invention that at the stage of scissiparity, the moment when the wall is very fragile as a result of its division, an osmotic pressure of at least 60 atmospheres is used to burst the rigid wall of the bacterium.

The bacterial strains, being in the so-called competent state, are inoculated at the rate of 0.1 ml of culture into 10 ml. of a hypertonic saline solution in which the osmotic pressure established is about 80 atmospheres, this state being maintained for a period of 12 to 24 hours. The high osmotic pressure is achieved by electrolytes consisting of inorganic salts and 0.3 M sucrose, which are good stabilizers of the osmotic pressure.

The plasmolysis is carried out under a nitrogen or $CO_2$ atmosphere on bacteria undergoing anaerobiosis, and in a conventional manner on bacteria undergoing aerobiosis. Liver micro-organisms undergoing aerobiosis were obtained at an rH of between 20 and 40, and stable L variants undergoing anaerobiosis were also obtainable on lowering the rH to below 20 by introducing nitrogen and carbon dioxide into the medium.

The applicant has discovered that the bacteria which are suitable for induction by osmotic shock are those which do not posses a capsule enclosing the wall (non-encapsulated bacteria) or a thick wall, and of which the cytoplasmic water is not in the form of a gel. The microorganisms which belong to the Enterobacteriaceae, Microccocaceae, Pseudomonadaceae, Parvobacteriaceae, Actinomycetes and Vibrionaceae meet these conditions.

According to the process, on treating the bacterium in the course of cellular division and in the detailed ways described, bacteria have been observed, for one and the same strain, on which the high osmotic pressure has not had an effect; in fact, overall 70 percent of the bacilli have undergone a definitive mutation and the other bacilli have remained intact. In the process of the invention, bacteria have never been obtained which have a partially changed wall (reversible mutation).

The stable variants obtained are separated off by filtration (the variants being ultra-filterable) and transplantation.

If the unmodified bacteria are few in number in the culture medium they die, the medium being unsuitable for their multiplication, or simply because it is impossible for them to subsist through failure in absorption or elimination.

When the number of unmodified bacteria is large, a new culture is produced in a short time which subjects some of the transformed elements to lysis; this case may occur once in six times. The bacterium may thus perhaps possess sufficient nutritive reserves to resist the high osmotic pressure during the induction period.

The stable variants obtained are very sensitive to osmosis. It is thus necessary for the acellular preservation medium to be osmotically equilibrated, that is to say if the medium is hypotonic the variant swells and bursts, and if it is hypertonic the variant shrivels up.

For their preservation, the medium containing peptone and glucose and enriched in nucleic acid and adenosine diphosphate is used which has already been employed for the inoculation preceding the induction, but because of the new structure of the variants it is necessary to equilibrate the medium from the point of view of the osmotic pressure by applying a suplementary osmotic pressure of 20 to 30 atmospheres at 22°–37 C. It is this difference in pressure which makes it possible to cause the variants to expand in a nutrient medium which is suitable for the culture of the bacteria. This difference in pressure is achieved by incorporating into the nutrient medium elements which regulate the cellular permeability, and it corresponds to the partial osmotic pressure of the whole of the said regulating elements. Suitable regulating elements are sucrose and inorganic salts.

The inorganic elements, in equilibrated proportions, regulate the pH and facilitate the exchanges between the L variants and the ambient medium; they avoid the destruction of the micro-organisms and permit their survival.

Traces of potassium are indispensable for the phenomenon of permeability at the cellular membrane level; magnesium is necessary for syntheses; sodium chloride influences the cellular permeability and thus influences the exchanges between the variants and the external medium. These substances, together with sucrose, are good stabilizers of the osmotic pressure. Sodium bicarbonate makes it possible to maintain an alkaline pH, phosphorus is an important element, and phenol red is an indicator of the metabolic activity of the micro-organisms.

In a well-equilibrated medium the elements which have been transformed remain intact for months, and a transplantation every four or six weeks suffices. It has been possible to preserve strains of mutants for more than three years by means of this process.

An Example of carrying out the process of the invention is given below.

EXAMPLE

An enterobacterium, *Proteus rettgeri*, was used as the starting material.

In order to avoid any error in interpretation, the medium chosen was acellular (synthetic medium containing neither serum nor lysozyme nor antibiotic). The bacteria were inoculated onto a medium consisting of 20 g percent of pancreatic peptone, 2 g. percent of glucose, enriched with 0.10 g. percent of nucleic acid and 0.01 percent of adenine diphosphate, with 0.01 percent of a phenol red colored indicator and water in sufficient amount to make 1,000 ml.

The inducing agent was plasmolysis and was exerted at the moment that the bacilli were in course of cellular division, at which moment the wall is, by virtue of its division, very fragile, by carrying out the process in the exponential phase of growth.

Under the effect of osmotic shock, the micro-organism, instead of remaining included within its rigid envelope, is expelled into the medium thus having the cytoplasmic membrane as its sole protection.

In the case of *Proteus rettgeri*, and under the experimental conditions defined above, it was found that there was one generation every 15 minutes, at which moment the inducing agent was caused to act.

The bacilli are, at the moment of scissiparity, introduced at the rate of 0.1 ml. of culture into 10 ml. of a hypertonic saline solution of which the pH is between 7.5 and 8.4 and the osmotic pressure about 80 atmospheres, for a period of 12 to 24 hours. The osmotic pressure of about 80 atmospheres was obtained by means of the following medium:

|  | g% | Osmotic pressure of each element (atmospheres) |
|---|---|---|
| 0.3 M sucrose | 102 | 7.4 |
| Calcium chloride | 4 | 3.6 |
| Sodium chloride | 40 | 36 |
| Sodium bicarbonate | 1 | 1.27 |
| Magnesium chloride ·6 H$_2$0 | 14 | 15.3 |
| Magnesium sulphate · 7 H$_2$0 | – | – |
| Sodium sulphate | 18 | 13 |
| Potassium chloride | 0.6 | 0.4 |
| Phenol red | 0.01 |  |
| Doubly distilled water, q.s.p. | 1000 |  |
| Osmotic pressure of the whole of the elements, in atmospheres |  | 76.97 |

For the preservation of the stable L variants of *Proteus rettgeri*, the composition of the medium, maintained at 37° C. was as follows:

Preservation Medium for L3 A Variants

| Composition | g °/oo | Osmotic Pressure (atmospheres) |
|---|---|---|
| Pancreatic peptone | 20.00 |  |
| Nucleic acids | 0.10 |  |
| Adenosine diphosphate | 0.01 |  |
| Glucose | 2 |  |
| 0.3 M sucrose | 102.00 | 7.4 |
| Calcium chloride | – | – |
| Sodium chloride | 18 | 15.7 |
| Sodium bicarbonate | 2.00 | 2.4 |
| Magnesium chloride .6 H$_2$0 | 0.10 | 0.1 |
| Magnesium sulphate .7 H$_2$0 | 0.40 | 0.07 |
| Sodium sulphate | – | – |
| Potassium chloride | 0.40 | 0.22 |
| Phenol red | 0.01 |  |
| Doubly distilled water, q.s.p. | 1000 |  |
| Supplementary osmotic pressure in atmospheres |  | 25.89 |

Having been able to preserve the strains by transplanting every 4 to 6 weeks, it can be concluded that the L mutants obtained by the process of the invention survive and as a result it has been possible to study their morphology and cytology, their mode of reproduction and their pathogenicity.

Numerous analogies have been observed between the variants obtained by the process of the invention starting from bacteria, and mycoplasms.

There are strong reasons for presuming that the L variants obtained and mycoplasms are identical, taking into account the morphology, the evolutionary cycle and the pathogenic activity. Like the mycoplasms, the L variants can be ultra-filtered and are between viruses and bacteria in the scale of classifications.

The fact that they have lost their wall and only retain a fine cytoplasmic membrane of extreme plasticity brings them close to the mycoplasms, which are agents of latent sub-acute and recurring infections, isolated by successive transplantations and appearing, as regards their etiology, to be attributable to irreversible and hereditarily transmissible definitive mutations.

The variants obtained have, in common with mycoplasms, their size, the fact that they are ultra-filterable, their nutrient requirement in an acellular medium, their lack of resistance to physical agents, their osmotic fragility and the appearance of the colonies on a solid medium, namely a heavily encrusted opaque central zone in agar, surrounded by a superficially transparent halo.

The microscopic characteristics of the cultures are typical and always similar regardless of the original bacterium. Bacteria as different as the vibrios, the proteus group and the streptococci give rise to L organisms of identical appearance.

The analogy with the mycoplasms also manifests itself in the morphological and cytological appearance of the L variants obtained. As the wall is responsible for the Gram stain, it is not surprising that bacteria modified through the disappearance of their walls are Gram-negative.

The L variants obtained are stained by the conventional stains used in cytology and histology. The preparations, dried as a section without being fixed, are stained by means of a Shorr Trichom Trichoma Stain (Gurr's formula) bath for 10 minutes and rinsed with t-butyl alcohol, this being a solvent which does not remove the stain from the structures to which it is fixed. The cells are delicate and deformable; they have a varied morphology, being globules, rings, small granulations, ovoids, coccobacillary bodies in the shape of keys, commas or question marks, fine spiral bacilli in the form of chains or separate, curved or flexuous granular filaments (see FIGS. 2 to 4 of the accompanying drawings).

The definition of the mycoplasms given by SABIN gives a similar morphological appearance: "The organisms of the type of cattle peripneumonia can vegitate on media devoid of living cells, giving microcolonies of 10 to 20$\mu$ diameter, with extremes of 600$\mu$. Under the microscope, annular formations, globular bodies, pseudo-mycelial filaments and elementary bodies are observed."

The cytological structures observed are the same for the L variants obtained and for the mycoplasms: a fine limiting membrane, a vacuolated or vesiculated appearance of the cytoplasm, the formation of elementary bodies by budding, differentiation of the ribosome zones and a central reticulum of nuclear material.

The abundant cytoplasmic mass in the bacterium is reduced and collected together against the inner layer of the membrane. The nucleus occupies almost the whole volume. It takes the form of numerous granules of varying size and shape, connected to one another by fine filaments. The granules are rather dense. The nuclei divide and re-combine without resulting in the cytoplasmic divisions which at maturity form the voluminous nuclear mass of globules.

On a metabolic plane, the stable variants and the mycoplasms appear both to have identical requirements.

Attempts at culture by the customary processes if the wall is completely destroyed frequently remain negative and require the medium to be enriched. The culture of the mycoplasms is itself difficult and the culture media used have empirical formulas. In an acellular medium several weeks, and sometimes several months, are required to see them develop. The cultures must only be declared negative after 40 days under favorable conditions.

The antibiotics which act on the bacterial wall are no more effective than the antibiotics which do not penetrate into the bacterium and have no effect on the L variants obtained or on the mycoplasms. The only antibiotics which have an effect are those which act on the reproduction mechanisms, the transformation of the genetic information and the syntheses of the proteins which are the only substances which really penetrate into the cytoplasm.

Finally, like the mycoplasms, the stable L variants do not reproduce by scissiparity.

According to the work of TURNER, it appears that the mycoplasms possess an evolutionary cycle. Now the evolutionary cycle of the L bacterial variants had not hitherto been proved. No experiment had hitherto made it possible to demonstrate that the dwarf forms could be viable and that the filaments were not vestiges of burst elements.

It has proved possible to demonstrate the reproduction cycle of the stable variants by inter-crossed transplantations, by successive staining of cultures of stable variants according to the invention by Unna Blue (metachromic stain) approximately every hour, and by systematic repetitions of observations under the same working conditions. It has proved possible to observe the characteristics of their cenocytic structure (a plasmodial and syncytial state) and the very special interest of this complete biological cycle (diploid and haploid phase) which necessarily brings about the phenomenon of chromatic reduction demonstrated on a section.

The spheroidal phase always occurs before the mycelium phase. Equally it seems that during the granular phase the granules liberated are not viable and cannot grow and again form a new cycle. The start of a cycle is given by the last-formed of the spheroids of the filamentous ends, or of the ramification branches subjected to lysis and liberating their spheroid separately.

The cycle lasts 6 to 10 days and can re-occur over the course of several months in an appropriate medium. Initially the phases are rather well synchronized; as the cultures become old, a functional disorder becomes established and different phases are found together at the same time and the L3 A variant appears to have a preference for the pseudo-mycelium form (resting in the latent state).

To study the cycles or confirm the pathogenic strength of the variants, the transplantations must take place during the spheroidal phase in the almost pure state.

These observations make it possible to understand the confusion created by authors who have studied the L forms and the impoverishment of the cultures of variants in the course of transplantations.

It has thus been shown that the variants obtained possess an evolutionary cycle of several phases and a type of organization which is no longer that of the bacterium from which they are derived.

During a cycle, four periods occur in succession; these periods possess a distinct individuality but can however not be considered as the only possibilities of this complex process; they succeed one another in a well-defined order:

Spheroidal Phase (compare FIGS. 4 to 7 of the drawings) the elements are isolated, have a mucous appearance, and are more generally stuck against one another in a mass; at the very start the spheriods increase in volume (0.5 to 2$\mu$), and cytoplasmic excrescences then form which trap chromatic corpuscles which emit one, two or more short and narrow filaments; the end of these filaments is free or carries new spheroid or ovoid particles, like bulges, and the filaments remain attached to the central sphere or detach themselves from it.

Mycelium Phase (compare FIGS. 8 to 10 of the drawings) regular aggregates of spheroids detach themselves from the filaments, which become extended into chains of several tens of microns in length and interlace or branch to the point of forming a true mycelium.

Granular Phase (compare FIGS. 11, 11 bis, 12, 12 bis of the drawings) the filaments and the primitive spheroid forms become blurred while the inclusions fragment and remain attached to one another by a thin layer of a viscous secretion, giving the culture the appearance of cocciform small chains or irregular groups of various micrococcus.

Disintegration Phase (compare FIG. 13 of the drawings) the elements degenerate, the small chains of granulation break, and the particles spread in the extracellular medium; under the conditions of the experiments which have been carried out these particles are not viable.

It is between the third and the fourth phases defined that the primitive bacteria are reduced to their simplest form: a chromatin particle surrounded by a very malleable fluid substance.

It is thus possible to conclude that the L variants obtained not only survive but reproduce themselves by a method of reproduction which is intrinsic to them and identical to that observed for the mycoplasms (compare FIGS. 17 and 18). Here the same possibility of forming filaments during the mycelium phase, and the same tendency towards the parasitary life during the spheroidal phase are again found, and the spheroids are "rest" forms (microcyte germs) which are able to remain quiescent for a very long time and can undergo and resist maltreatments.

A cycle lasts about 10 days and in an acellular medium it comprises two prospering phases, a decadence phase and a degeneration phase; the spheroidal elements liberated during the granular phase reproduce an identical cycle.

Since the L variants obtained according to the process of the invention are viable and can reproduce in a well-defined evolutionary cycle, the problem of their survival in the organism and of their pathogenic role arises.

The L variants obtained exert a cytopathogenic and cytotoxic effect upon the cell.

In order to test the said hypotheses, variants of *Proteus rettgeri* obtained according to the invention were taken and inoculated onto vaginal cells collected by means of an Ayre plate by scraping at the level of the rear third of the closed passage of the vagina after disinfection. The cells, suspended in Hanks liquid medium, are inoculated with a pure culture of L variants obtained by the process described above during the spheroidal phase (sessile spheroids) at the rate of about 0.1 ml per 1 to 2 ml of suspension.

The use of a direct sample was preferred, to avoid possible errors in interpretation, using preparations from the Institut Pasteur to which have been added 100 units of penicillin per ml and 125 mg of thallium acetate per liter of medium. After a period of 2 to 6 days a cytotoxic strength was observed in the cells.

The L variants obtained by means of the invention are localized in the area of the cellular cytoplasm, close to the nucleus, in the form of ovoid granulations, or ring-shaped or crescent-shaped bodies, with the spheroid elements forming kinds of inclusions; they are surrounded by a fine skin which clearly divides them from the cytoplasm; the nuclei are hardly affected during this time (compare FIG. 4 of the drawings).

A comparison sample without inoculation with stable L variants did not show the degeneration or toxicity phenomena. The study cannot be valid if the comparison cells show an abnormal degeneration during this same period.

Other experiments were carried out using epithelial cells from monkey kidney provided by the Institut Pasteur. The L variants obtained by means of the invention are, as in the preceding case, directly inoculated into the medium at the rate of 0.1 ml per 1 ml of suspension when the L variants are in their spheroidal phase in a period of active multiplication.

The infection appears rather rapidly in the renal cells, generally 3 to 4 days after infection.

Nothing is observed in the non-inoculated renal cells, that is to say the comparison cells; against this, the various phases of the evolutionary cycle, namely filaments, granules and spheroids could be found in the renal cells inoculated with the stable variants (compare FIGS. 15 and 16 of the drawings).

In the two types of cells the Shorr stain (stain based on Gurr's formula) was used to show the stable variants. In the case of the renal cells, the May Grunwald hot Giemsa stain applied after fixing with methyl alcohol, gives good results.

The proliferation of the mycoplasm-like L variants obtained depends on the cell; in fact, several cases can arise:

1. The cell is not sensitive to the variant inoculated. It digests the foreign proteins and assimilates them to synthesize its own proteins. The cell survives, and the constituent elements of the germ, metabolized as a function of their chemical nature, are found again in the constituent elements of the cell. At this stage, the tests for detection of the variants by inoculation of the integrated material into other cells are negative and this is the basis of the immunity.

2. The cell cannot be invaded but proves incapable of metabolizing all the elements present. This is the case of unobserved infection (germ carrier). It does not show itself in a morphological modification of the cellular culture, but by a functional, metabolic or biochemical disorder compatible with the survival of the cell and of the stable variants (compare FIGS. 15 and 16 of the drawings). This latent infection can be transmitted to descendants. The L variants possess DNA and RNA; these nucleic acids can be incorporated in the cellular genetic potential during a division and become an integral part of the chromosomes.

If the induction shock has not taken place, the cell reproduces normally. If the shock has taken place, the variants obtained re-appear spontaneously, apparently without precedent and without an incubation. The cell serving the parasite can again offer a resistance.

3. The cell does not offer any resistance. The L bacterial variants impose their trademark on the cell which, during its period of survival, will manufacture nucleo-proteins of the L variant type. The cell dies through disappearance of the normal structures. Cellular degeneration occurs (compare FIG. 14 of the drawings). In FIG. 14, a mass of variants (mycelium phase) is seen at 1 and the nucleus of the cell, practically devoid of cytoplasm, is seen at 2.

The host cell and the infecting micro-organisms are both organisms possessing genetic continuity; from the moment when one of the two multiplies at the expense of the other or when one borrows from the other the supplement to the structural material which is required to build its nucleoprotein material, the conflict between the host cell and the L variant finds itself prolonged in the genetic continuity of the one which survives.

The pathogenic role of the mycoplasm-like L variants has also been studied by attempting to evaluate their potential pathogenic role.

In fact it is possible to confirm the role of germs isolated from lesions in a human organism by comparing its biological characteristics with the clinical facts and the circumstances of isolation.

It is the isolation of a mycoplasm on several occasions from the same patient in pathological products of the same origin, and above all the presence of these mycoplasms in surgically extracted items which have made it possible to determine the pathogenic strength of the mycoplasms.

One is thus dealing with virulent forms causing "atypical" illnesses, and since the germ no longer has the normal morphology of the bacterium it is difficult to detect; furthermore, this germ resists the usual therapeutic means, especially certain antibiotics, the role of which is to pass through the bacterial wall without preventing the viability of the germ.

The mycoplasms are no longer considered as simple saprophytes but as pathogenic agents of which the clinical manifestations observed in human pathology can be grouped under the general heading of "mycoplasmoses."

Apart from the morphological and cytological properties, the cultural properties, the appearance of the cultures and the study of the sensitivity to antibiotics, the progress made in the serological methods of identification has made it possible to know the antigenic structure of a certain number of strains of mycoplasms isolated from samples of human origin: bronchial aspiration, pleural liquid, ganglions, serosities, surgically removed items and marrow.

The phenomenon of neutralization of the antigens, when it applies equally to the mycoplasms and to the L variants obtained according to the invention, constitutes a point of similarity. In an identical manner each species of variants can be defined by a "mosaic" of antigens on a serological plane.

The agglutination and fixing tests of the complement prove that there is not complete identity on this plane between the stable L variants obtained and the bacteria from which they are derived.

It is evident that the L variants obtained by the process cannot possess the antigenic equipment which belongs to the bacterial wall, especially the flagellar antigen H. On the other hand it is possible to find, in the mosaic of antigens of the mycoplasm-like L variants, the antigens of the cellular body, those of the membrane and those of the constitution of the protoplasm of the original bacteria.

Thus serological examinations through growth inhibition, fixing tests of the complement, investigation of the antibodies in a section using the Ouchterlony method, and of the fluorescent antibodies can be carried out in parallel, so as to establish the presence of the same serological groups in the mycoplasms and in the L variants obtained, arising from bacteria of which they could be the mutants according to information given by the clinical table.

The Example given above, which is specific to a particular bacillus, was repeated by the applicants for other bacteria and thus made it possible to obtain from various bacteria stable L variants in quite large amounts similar to the mycoplasms, with these bacterial variants playing an important infectious role both in human medicine and in the veterinary field.

In fact, on carrying out the process starting from bacteria of very varied types, it was possible to arrive at mycoplasm-like L variants similar to various mycoplasms the infectious role of which in atypical illnesses, and the antigenic specificity of which, is known.

Each strain forms a distinct serological group consisting of a mosaic of specific antigens. From this fact it is possible to establish the serological relationships between the L3 A bacterial variants and the isolated mycoplasms.

Thus on applying the process to MICROCOCCACEAE which include streptococci A and D and staphylococci, to ENTEROBACTERIACEAE (*Krebsiella, Proteus*, Salmonella and Shigella) L bacterial variants are obtained which are similar to Mycoplasms already known: *Mycoplasma pneumoniae, Mycoplasma hominis, Mycoplasma mycoides, Mycoplasma bovigenitalium* and Mycoplasma T.

In particular, starting from a haemolytic streptococcus, a stable L variant is obtained which is entirely similar to Negroni agent, which has been isolated from leucaemic marrow and which has been linked with mycoplasm hominis type 2.

Starting from NEISSERIACEAE (*Neisseria gonorrhoreae*), a stable variant is obtained which is very similar to the mycoplasm hominis which is known to be generally non-pathogenic and which can occasionally give rise to Bartholin abscess. This mycoplasm is considered to be the agent responsible for certain non-gonococcidal urethrites (compare FIGS. 17 and 18 of the drawings).

Some cases of the use of the mycoplasm-like L variants obtained in accordance with the invention have been given below by way of non-limiting examples.

Because of the ease of carrying out the process of the invention, pure strains of bacterial variants possessing pathogenic power and antigenic extracts, devoid of cells, have been obtained.

The antigenic reality of the variants obtained by the process of manufacture has been demonstrated by means of a serum obtained by injecting these variants into a rabbit. For this purpose, an antigenic extract devoid of cells was prepared from stable L variants of Proteus.

The antigenic principles were extracted by treating a suspension of previously washed germs with an aqueous solution of half-normal trichloracetic acid at a pH of 1 to 2 and at a temperature of 0° C.

The antigenic extract is in the form of an opalescent solution which it is absolutely not possible to dialyze. When desiccated, it is heat-stable; on the other hand, it is heat-sensitive in aqueous media.

When injected into the animal it causes the appearance of specific antibodies; thus, in a highly diluted form, it is precipitated specifically by a corresponding antigenic antiserum. Finally, it behaves like an active endotoxin; when injected into the animal it in effect triggers the appearance of antitoxin.

This isolated acid-soluble antigenic L3 A compound appears to be strongly polydispersed in an aqueous solution.

It is very soluble in water and decomposes under the action of heat or of a diastase; the polysaccharide fraction becomes detached from the remainder of the antigenic complex, thus breaking a less strong bond than that which holds the antigens of the bacterial body.

It is thus possible to isolate the constituents of the antigenic extract of the L variants of Proteus: a specific polysaccharide of the L variants obtained, which is responsible for the characteristic serological reactions of the strain. This liberated polysaccharide can be precipitated by adding several volumes of alcohol or of acetone.

The polysaccharide gives the antigenic protein element its specificity and is responsible for the characteristic serological reactions of the strain.

The stable L variants obtained according to the process of the invention have been used for the manufacture of reagents for serodiagnostics and for the identification of the infectious agents of atypical illnesses.

These serological reagents make it possible to investigate a specific treatment (sensitivity to antibiotics or to other therapeutic agents).

They also are of definite value in investigating the etiology of the isolated mycoplasms in infectious pathology.

It is evident that the mosaic of antigens as it exists in the cell of intact stable L variants contains substances other than the phospholipid, polysaccharide and protein components, but it is conceivable that only the polysaccharide and protein components are essential elements for the antigenic behavior.

Another example of the application of the process for obtaining stable bacterial variants and for their preservation is the preparation of vaccines by means of cultures of mycoplasm-like L variants (judiciously diluted live cultures).

Germs of L variants are obtained according to the process of the invention which do not possess virulence but have an immunitary activity, by centrifuging the culture, suspending the centrifuge cake, washing with physiological water and heating to 40°–50° C for 30 minutes. The aseptized suspension of L3 A variants is diluted to a particular concentration. 0.1 ml doses of the infectious dose diluted to concentrations of $10^{-5}$ to $10^{-6}$ are used. Filtration is carried out on membranes of which the pores have a diameter of between 100 and 150 millimicrons.

It is also possible to utilize inactivated germs by attenuating the strain with ether or chloroform or by treatment with formaldehyde and heating to 56° C for one-half hour.

Because of the use of an artificial culture medium, the process and the possibility of obtaining mycoplasm-like forms from bacteria by the process described in the invention, various applications are of real interest.

The Figures given in the drawings have been reproduced from photographs taken by the Applicants. The enlargement of each photograph is indicated in the table below:

| Figure | | Enlargement |
|---|---|---|
| 1 | | 2,500 |
| 2 | | 2,500 |
| 3 | | 2,500 |
| 4 | | 3,375 |
| 5 | | 3,375 |
| 6 | | 3,375 |
| 7 | | 3,375 |
| 8 | | 3,375 |
| 9 | | 3,375 |
| 10 | | 3,375 |
| 11 | ≅ | 8,000 |
| 11 bis | ≅ | 8,000 |
| 12 | ≅ | 8,000 |
| 12 bis | ≅ | 8,000 |
| 13 | | 3,375 |
| 14 | | 3,375 |
| 15 | ≅ | 12,000 |
| 16 | ≅ | 8,000 |
| 17 | ≅ | 8,000 |
| 18 | ≅ | 8,000 |

FIG. 1 represents *Proteus rettgeri* not subjected to plasmolysis. FIG. 2 shows the pleomorphic appearance of the variants of *Proteus rettgeri*, with an identical enlargement to that of FIG. 1.

FIGS. 3 to 13 relate to the evolutionary cycle. In the spheroidal phase stage A the variants combine into a mass in the 12 to 72 hours which follow the inoculation, depending on the conditions of the plasmolysis; FIG. 4 shows, enlarged, the isolated elements taken from a mass according to FIG. 3.

In the spheroidal phase stage B (FIGS. 5 to 7) the formation of a cytoplasmic excrescence surrounding the chromatic corpuscles which emit free filaments or filaments carrying fresh spheroidal particles can be seen.

The mycelium phase is observed from the 3rd to the 6th day following inoculation. FIG. 8 illustrates the mycelium elements as a mass; FIG. 9 shows an isolated element; FIG. 10 shows the transition from the mycelium phase to the granular phase.

FIGS. 11 and 12 represent filaments at the start of the granular phase (6th or 7th day after inoculation). The filaments become blurred like the primitive spheroidal forms, and the inclusions fragment, linked by a thin layer of a viscous secretion (compare FIGS. 11 bis and 12 bis). FIG. 13 shows the start of the disintegration phase.

FIG. 14 represents an epithelial cell of the kidney of a monkey; a mass of spheroidal forms of variants is seen at 1, and at 2 it is found that the nucleus of the cell is devoid of a part of the cytoplasm.

Figure 1:
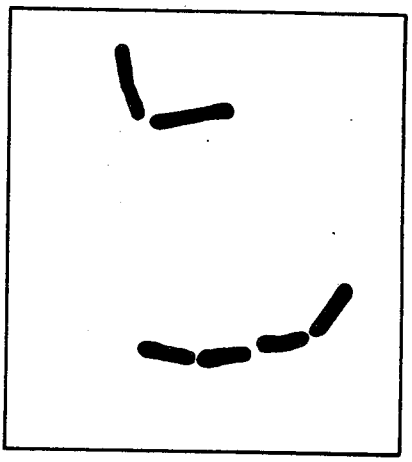
Figure 2:
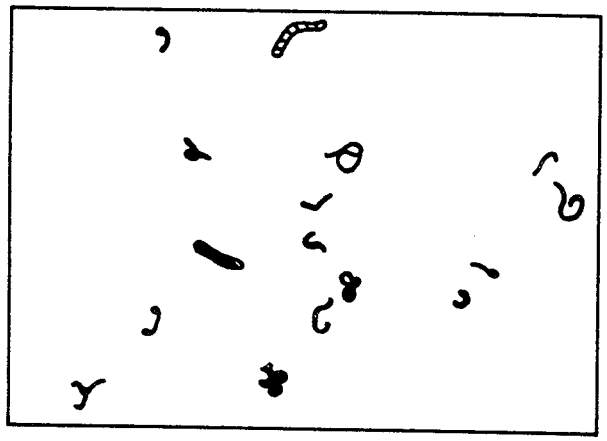
Figure 3:
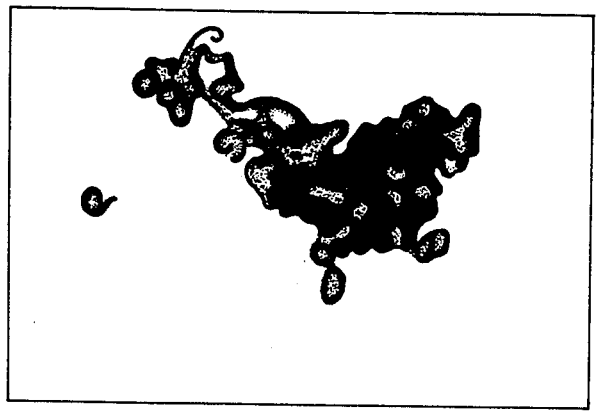
Figure 4:
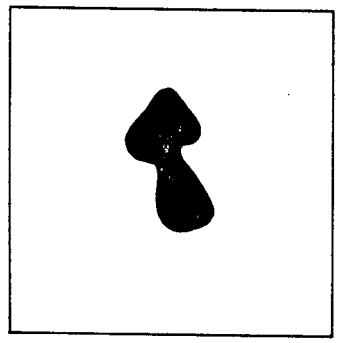
Figure 5:
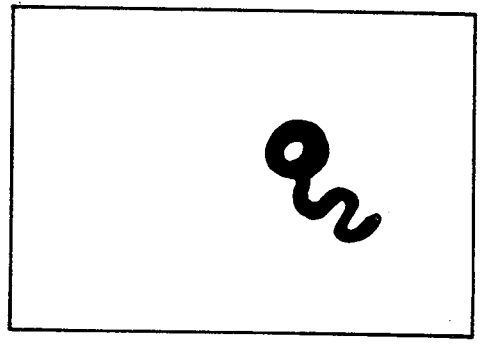
Figure 6:
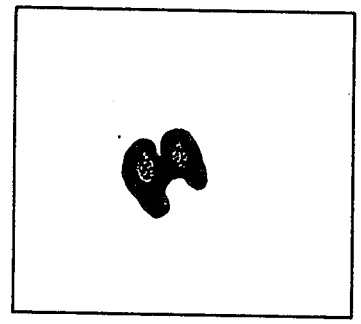
Figure 7:
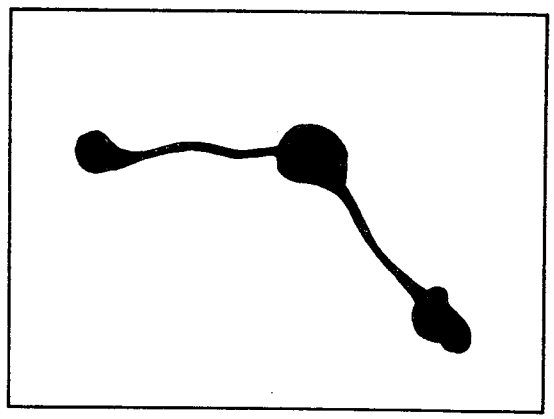
Figure 8:
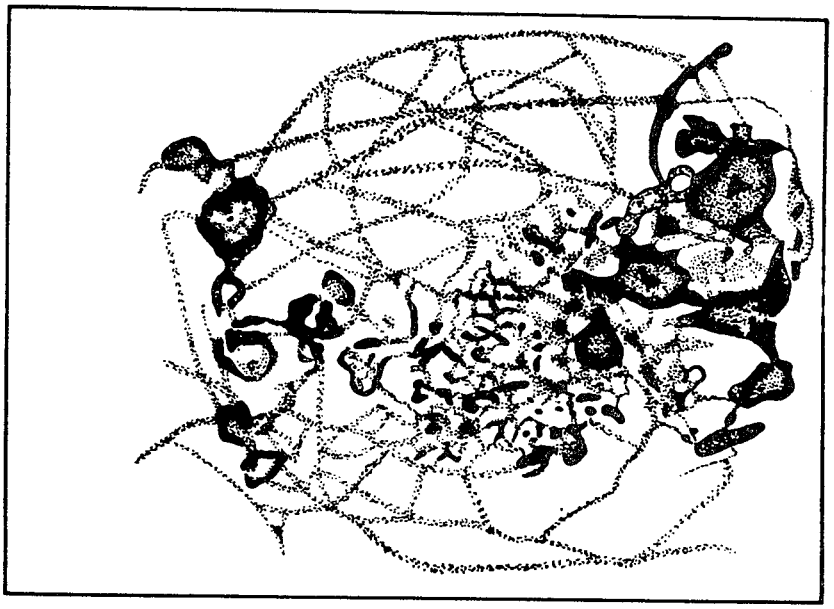
Figure 9:
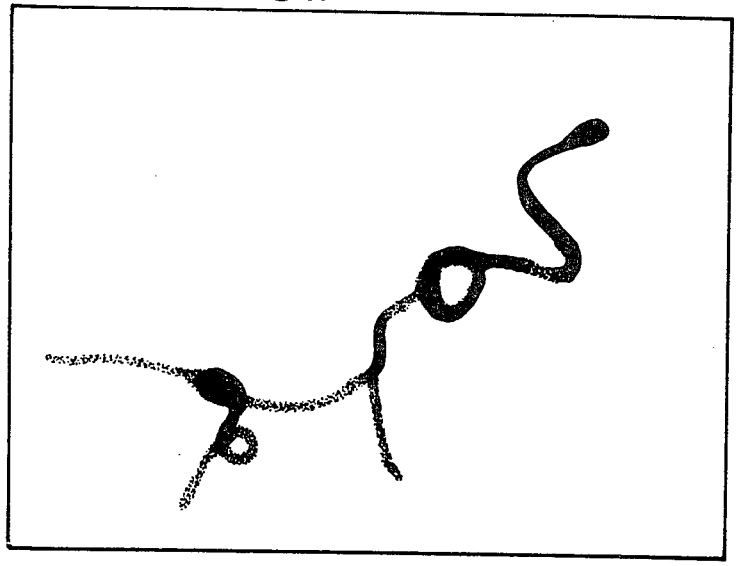
Figure 10:
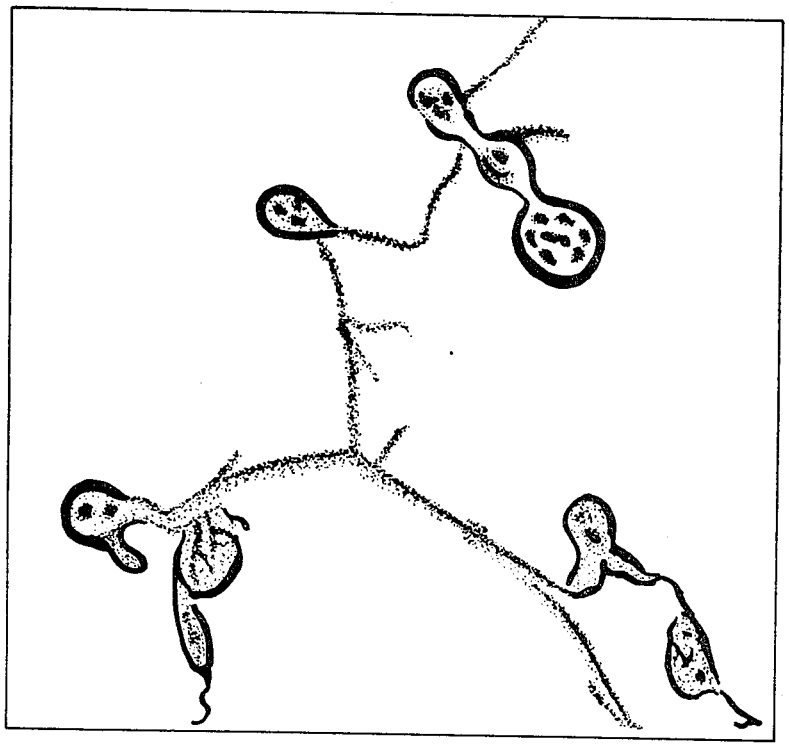
Figure 13:
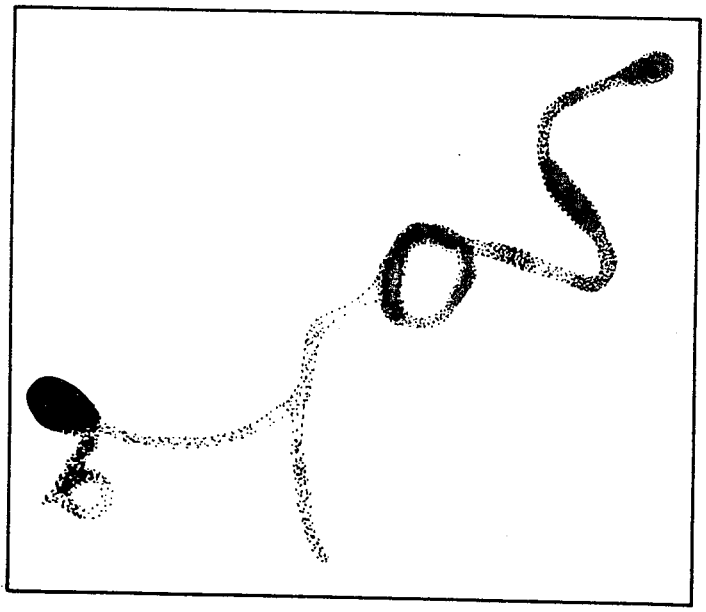
Figure 14:
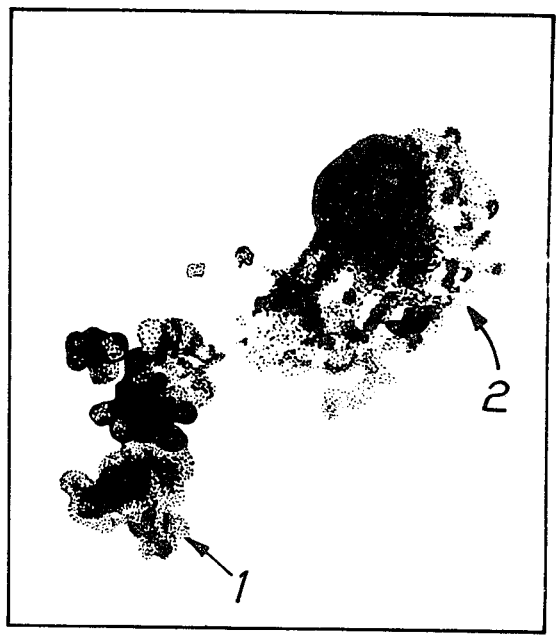
FIGS. 14 to 18 represent cases of cells infested by variants of *Proteus rettgeri* (FIGS. 14 to 16) and by germs of an "atypical" illness (FIGS. 17 and 18).
Figure 15:
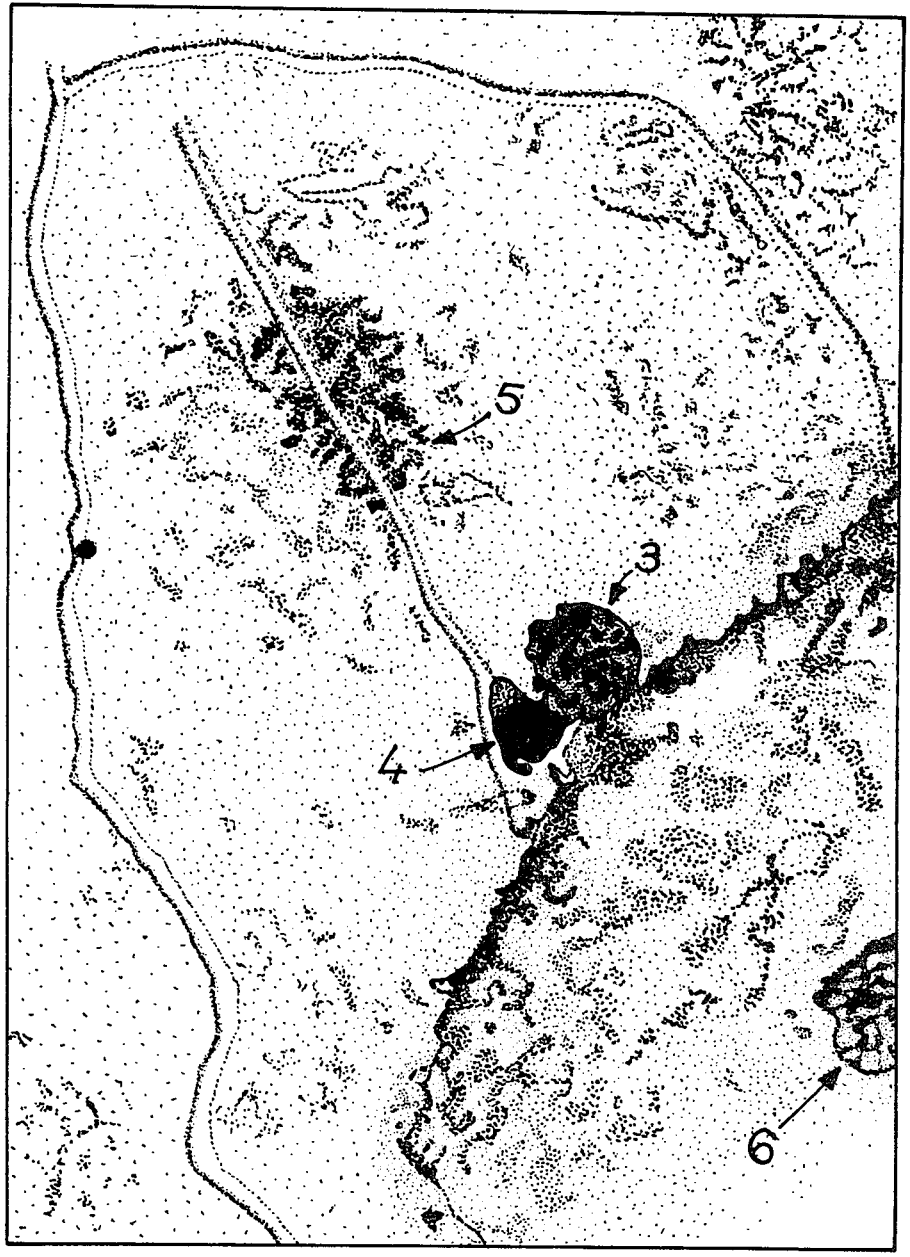

Two epithelial cells of nuclei 3 and 6 have been shown in FIG. 15; the spheroidal element of the variant 4 and the filament 5 are distinguishable.

Figure 16:
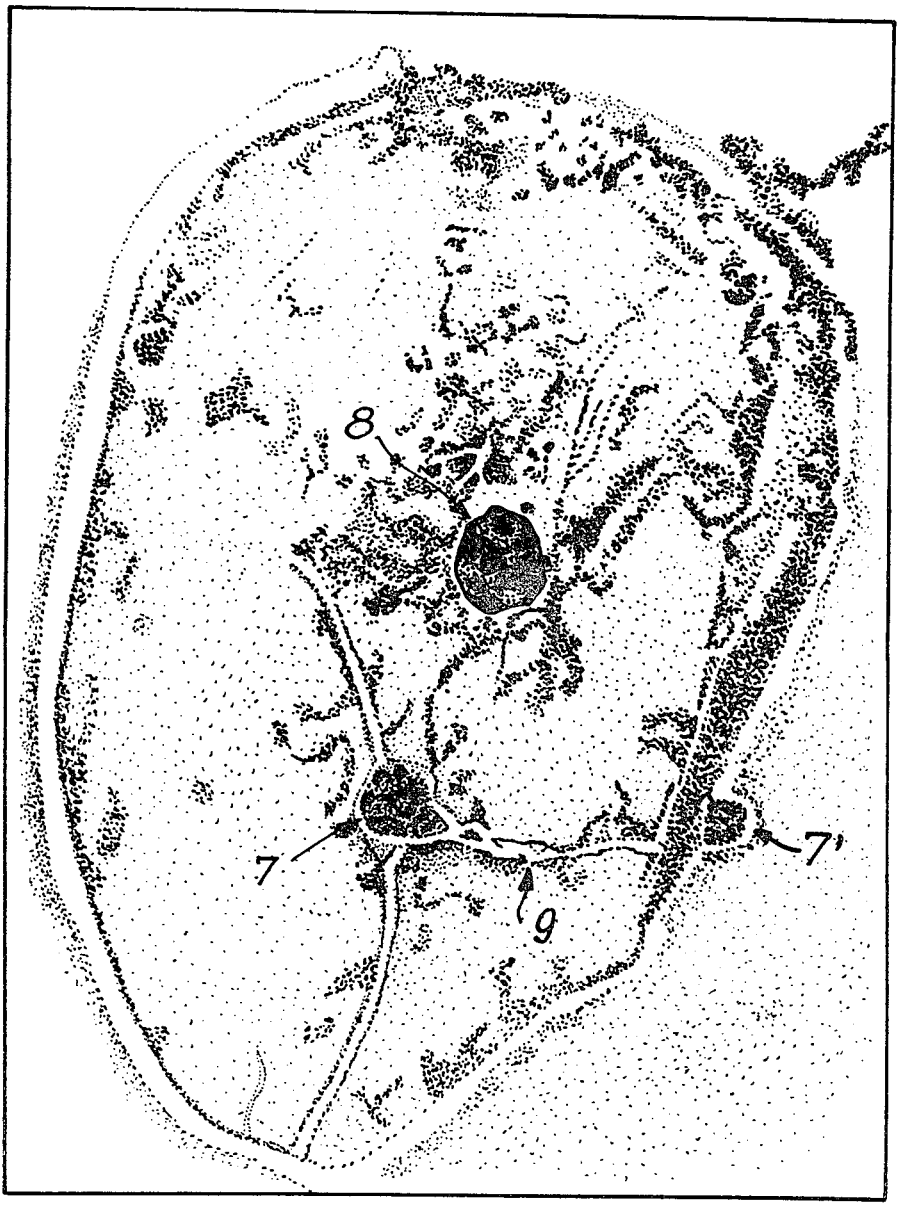

The spheroidal forms 7 and 7', joined by a filament 9, are seen in FIG. 16; in the cell of nucleus 8 the shape 7 shows two further filaments 10 and 11.

Figure 17:
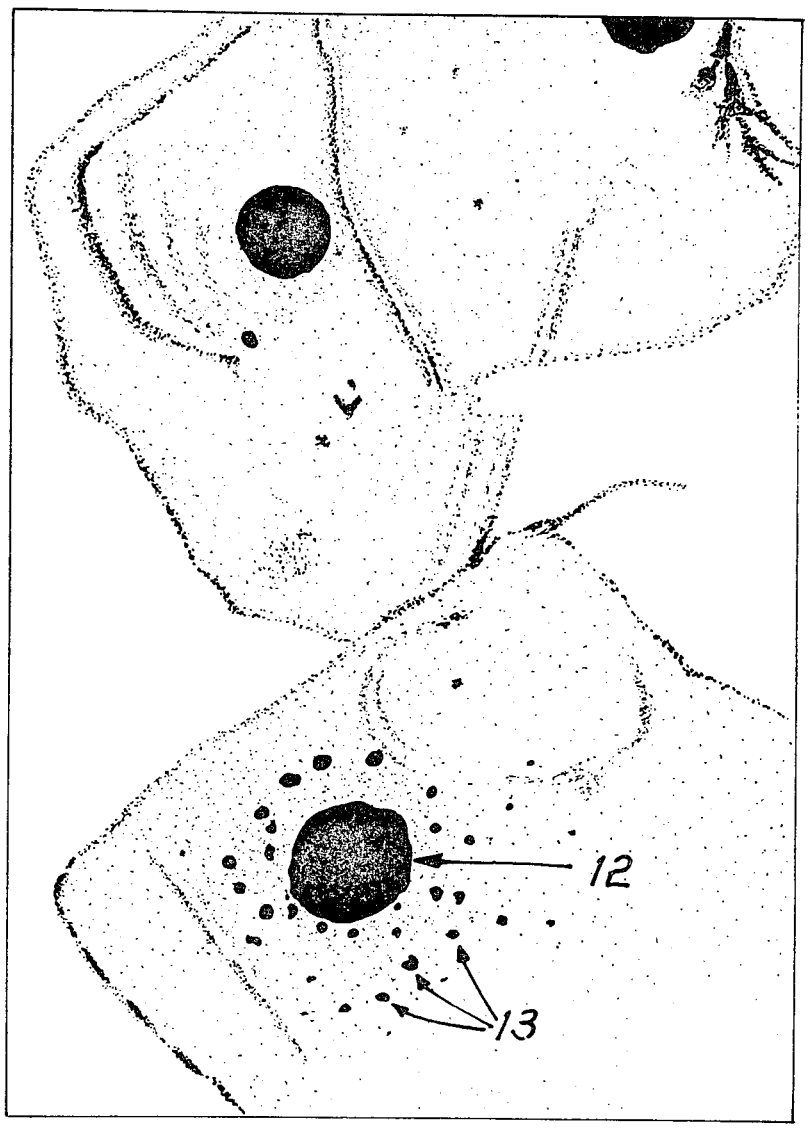
Figure 18:
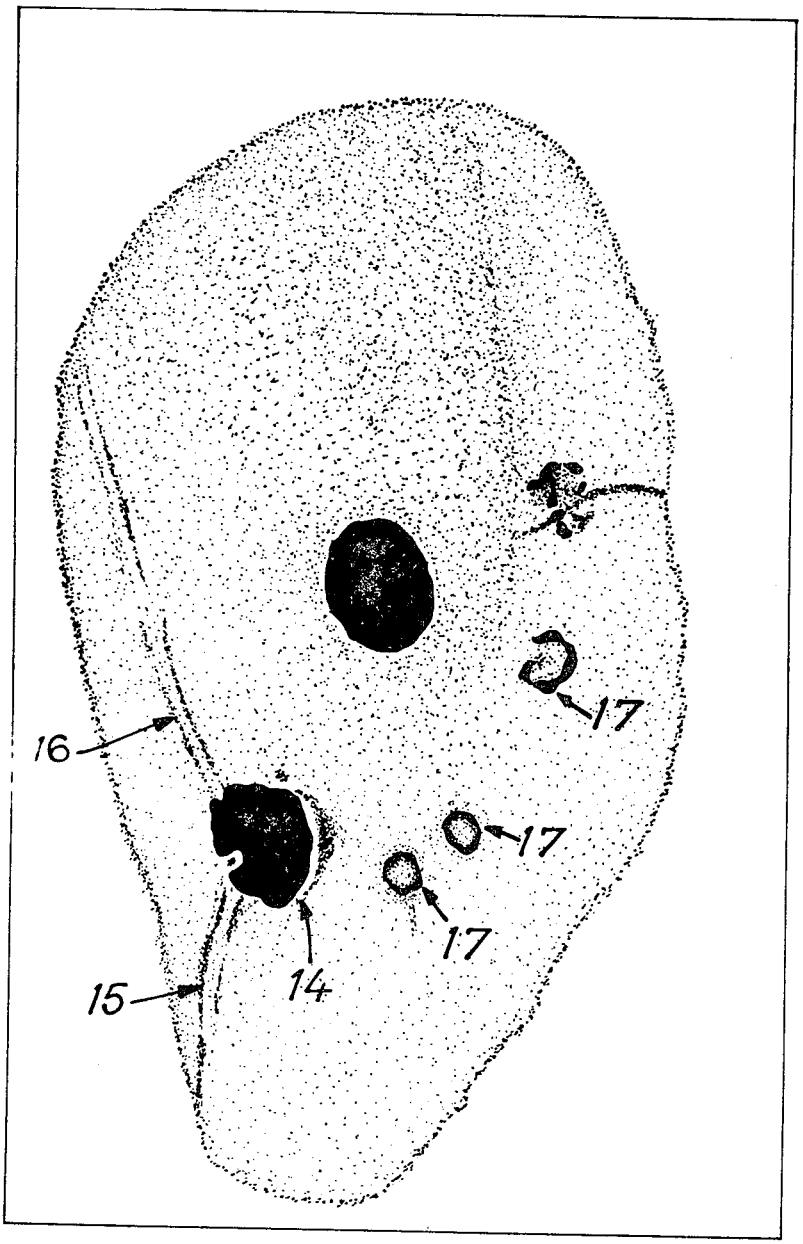

FIG. 17 is a case of amicrobial urethritis. The nucleus 12 is surrounded by inclusions 13. FIG. 18 is a second observation of the same case of amicrobial urethritis. Here it is possible to distinguish the characteristic inclusions corresponding:

1. to chlamydozoon infections [the group of trachoma, psittacosis and lymphogranulomatosis 17] and to mycoplasm infections [spheroid 14 with filaments 15 and 16].

Comparison of the infested cells of FIGS. 16 and 18 emphasizes the profound analogy between stable variants and mycoplasm; the inclusions 17 would give the inclusions 13 after the L3 A form bursts.

I claim:

1. Process for obtaining and preserving stable bacterial variants which are reproducible by a heteromorphic evolutive cycle from pathogenic or non-pathogenic bacteria and are useful for the preparation of vaccines and diagnostic agents, said process comprising adding the bacteria to an acellular medium and causing to act on a synchronized culture of the bacteria at the moment of scissiparity, a chemical, biochemical or physical inducing agent which destroys the bacterial cell wall without killing the bacteria and culturing thd transplanting the variants thus obtained at a temperature of 22°—37° C in an acellular nutrient medium which is osmotically equilibrated by electrolytes consisting of inorganic salts and sucrose, the partial osmotic pressure of the combination of the said electrolytes and sucrose being between 20 – 30 atm.

2. Process according to claim 1, in which the agent is plasmolysis by osmotic shock.

3. Process according to claim 2, in which the plasmolysis is effected in an acellular medium under an osmotic pressure greater than or equal to 60 atmospheres.

4. Process according to claim 3 in which the pressure is about 80 atmospheres.

5. Process according to claim 3, in which the bacteria subjected to the plasmolysis are the Enterobacteriaceae, Micrococcaceae, Pseudomonadaceae, Parvobacteriaceae, Actinomycetes or Vibrionaceae.

6. Process according to claim 5, in which the bacteria subjected to plasmolysis is *Proteus rettgeri*.

7. Process according to claim 3 in which the acellular plasmolysis medium contains sucrose and inorganic salts.

8. Process according to claim 1, in which the acellular culture and transplantation medium contains sucrose and inorganic salts.

9. Process according to claim 1 in which a culture of *Proteus rettgeri*, 24 hours old, in an aqueous culture medium containing, in grams per thousand trams of culture medium, 20 g. of pancreatic peptone, 0.10 g. of nucleic acids, 0.01 g. of adenosine diphosphate and 2 g. of glucose, is introduced into an aqueous hypertonic solution of pH between 7.5 and 8.4 having an osmotic pressure of 80 atmospheres and containing, in grams per thousand grams of solution, 102 g. of 0.3 M sucrose, 4 g. of $CaCl_2$, 40 g. of NaCl, 1 g. of $NaHCO_3$, 14. g. of $MgCl_2 \cdot 6H_2O$, 18 g. of $Na_2SO_4$ and 0.6 g. of KCl, at the rate of 0.1 ml. of culture per 10 ml. of hypertonic solution so as to undergo plasmolysis for 12 to 24, and the variants obtained are transplanted and cultured at 37° C in an aqueous hypertonic nutrient medium containing, in grams per thousand grams of the said medium, 20 g. of pancreatic peptone, 0.10 g. of nucleic acids, 0.01 g. of adenosine diphosphate, 2 g. glucose, 102 g. of 0.3 M sucrose, 18 g. of NaCl, 2 g. of $NaHCO_3$, 0.10 g. of $MgCl_2 \cdot 6H_2O$, 0.40 g. of $MgSO_4 \cdot 7H_2O$ and 0.40 g. of KCl, and transplanted every 4 to 6 weeks.

10. Process according to claim 9, in which the transplantation of the variants obtained is effected during the spheroidal phase of the evolutionary cycle of the said variants.

* * * * *